[19] United States Patent
Grötschel et al.

[11] Patent Number: 5,765,435
[45] Date of Patent: Jun. 16, 1998

[54] APPARATUS FOR INDICATING FUEL LEVEL IN A FUEL TANK

[75] Inventors: Norbert Grötschel; Horst Breuer, both of Neuss; Oswald Reuss, Unterelsbach, all of Germany

[73] Assignees: Pierburg AG, Neuss; Preh-Werke GmbH & Co. KG, Bad Neustadt, both of Germany

[21] Appl. No.: 549,054

[22] Filed: Oct. 27, 1995

[30] Foreign Application Priority Data

Oct. 27, 1994 [DE] Germany ............ 44 38 322.3

[51] Int. Cl.⁶ .................................................. G01F 23/36
[52] U.S. Cl. .................................... 73/313; 73/317
[58] Field of Search .................... 73/313, 317; 338/33

[56] References Cited

U.S. PATENT DOCUMENTS

| | | | |
|---|---|---|---|
| 2,752,783 | 7/1956 | Fauvelot | 73/313 |
| 4,441,364 | 4/1984 | Montie | 73/313 |
| 4,557,144 | 12/1985 | Lucchini | 73/313 |
| 5,105,633 | 4/1992 | Kuhlen | 73/308 |
| 5,341,679 | 8/1994 | Walkowski et al. | 73/317 |

FOREIGN PATENT DOCUMENTS

| | | |
|---|---|---|
| 0139873 | 5/1985 | European Pat. Off. |
| 0249542 | 12/1987 | European Pat. Off. |
| 2661497 | 10/1991 | France |
| 2661498 | 10/1991 | France |
| 2740653 | 3/1988 | Germany |
| 3735967 | 5/1988 | Germany |
| 4113509 | 10/1992 | Germany |
| 4411961 | 10/1995 | Germany |
| 2197484 | 5/1988 | United Kingdom |

*Primary Examiner*—Diego F. F. Gutierrez
*Assistant Examiner*—Willie Morris Worth
*Attorney, Agent, or Firm*—Ladas & Parry

[57] ABSTRACT

A fuel level indicator is mounted on a casing (2) in a fuel tank (1) and includes a float lever (6) connected to a lever arm (17), the float lever (6) having an elbow portion (16) passing through an opening (18) in lever arm (17) and projecting into a hole (15) in a holder (9) for rotation therein. At its lower edge (19) the lever arm (17) engages a collar (20) of holder (9) and at its upper edge (21) the lever arm (17) engages a collar (22) of holder (9). In this way, the lever arm (17), and thereby float lever (6), is guided radially and axially on the holder (9). The float lever (6) is releasably secured to the lever arm (17) by resilient snap tabs (23). Accordingly, precise support of the float lever is obtained with a simple construction and with easy assembly and disassembly of the float lever.

7 Claims, 1 Drawing Sheet

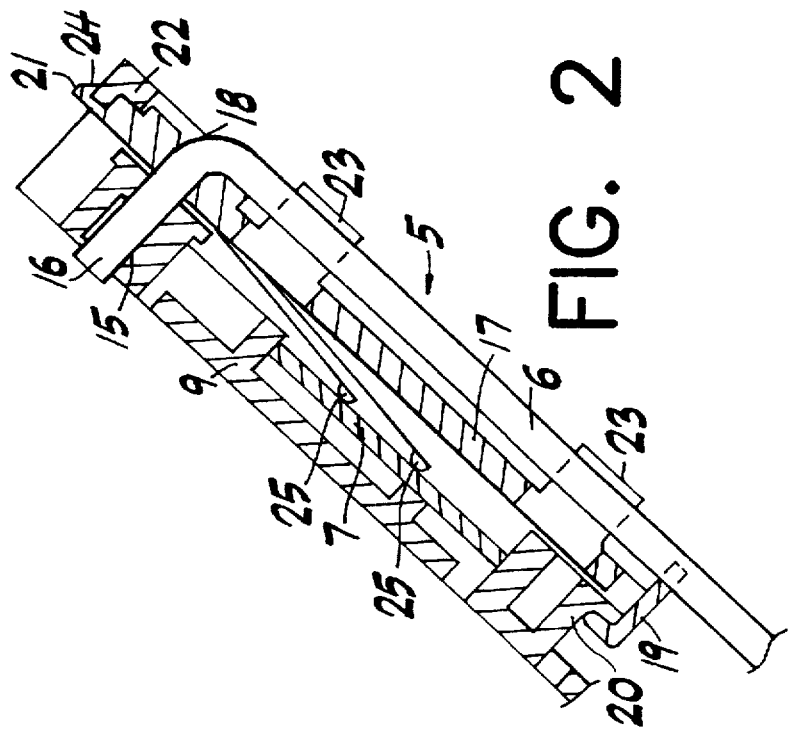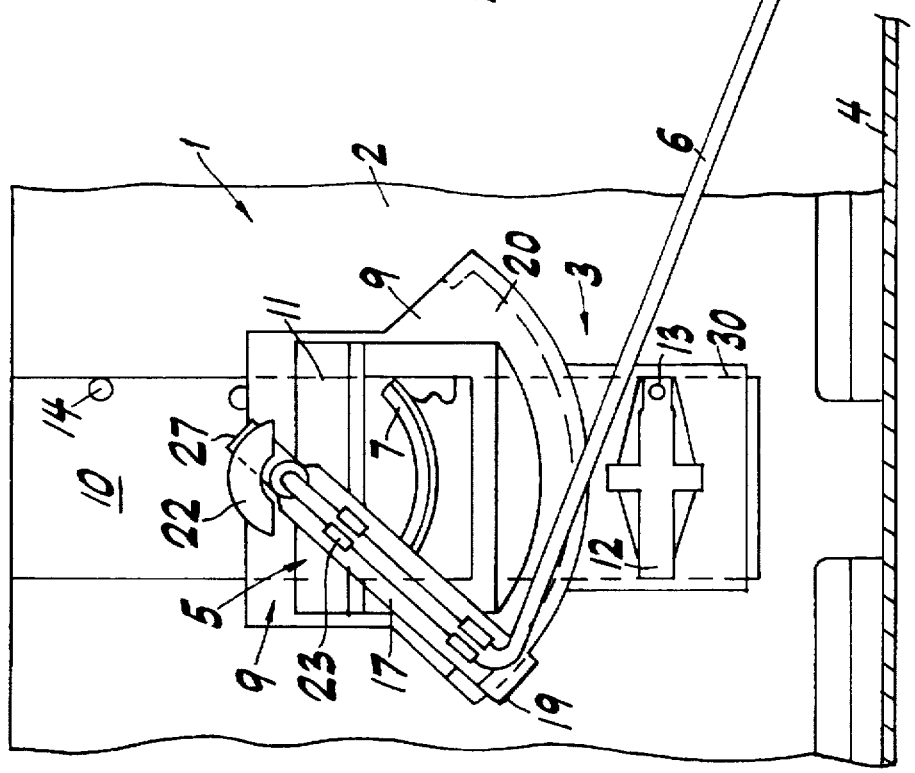

APPARATUS FOR INDICATING FUEL LEVEL IN A FUEL TANK

FIELD OF THE INVENTION

The invention relates to apparatus for indicating fuel level in a fuel tank in which a float lever acts on a potentiometer as a function of the fuel quantity in the tank.

BACKGROUND AND PRIOR ART

An apparatus for indicating fuel level in combination with a fuel pump has been produced by the assignee and is incorporated in the Golf vehicle made by Volkswagenmerk AG of Wolfsburg, Germany.

In this apparatus, the fuel pump is installed on the bottom of the fuel tank and the fuel level indicator is arranged at such a level on the casing of the fuel pump that the potentiometer influenced by the float lever operates at a maximum sensitivity over the entire extent of the variable filling state of the fuel tank.

In order to achieve this, it is necessary to provide precision guidance both axially and radially for the float lever to prevent abrupt jumps in the display of the fill state of the fuel tank.

EP-A1 0 249,542 discloses a fuel level indicator apparatus in which the potentiometer is adjustable with respect to the float lever. However, the construction of the support of the potentiometer is complex and expensive.

SUMMARY OF THE INVENTION

An object of the invention is to provide a fuel level indicating apparatus in which a precision support for the float lever is provided which is simple in construction and enables easy assembly and disassembly thereof.

In accordance with the invention, there is provided apparatus for indicating fuel level in a fuel tank in which electrical resistance of a potentiometer is varied as a function of the fuel level and wherein said apparatus comprises support means in the fuel tank including a holder supporting the potentiometer and a float lever assembly supported by the holder to vary the electrical resistance of the potentiometer as a function of the fuel level in the fuel tank. The float lever assembly comprises a float lever having an elbow portion rotatably supported in a hole provided in the holder and a lever arm secured to the float lever for travel therewith. The lever arm has upper and lower edges and includes engagement means at the upper and lower edges for respectively engaging collars provided at the upper and lower edges of the holder so that the lever arm is retained by the collars and is guided radially and axially as the elbow portion of the float lever rotates in the hole of the holder in response to change in fuel level in the fuel tank.

In further accordance with the invention, the float lever and lever arm are secured together by resilient clip means which can be in the form of resilient clips on the lever arm which releasably secure the float lever to the lever arm.

In further accordance with the invention, the engagement means at the upper and lower edges of the lever arm slidably ride on said collars and the engagement means at the upper edge can include a lip slidably engaging the collar thereat.

The potentiometer is held by the holder and is traversed by feelers on the lever assembly as the lever assembly moves in response to change in fuel level in the fuel tank.

BRIEF DESCRIPTION OF THE FIGURES OF THE DRAWING

FIG. 1 is a plan view from below in FIG. 2 of a fuel delivering device provided with apparatus for indicating fuel level according to the invention.

FIG. 2 is a side elevational view of the fuel level indicating apparatus in FIG. 1 in section.

DETAILED DESCRIPTION OF A PREFERRED EMBODIMENT

Referring to FIG. 1, therein is seen a fuel delivering means 1 which comprises a casing 2 containing a fuel pump 3. The casing 2 is secured to the bottom 4 of a fuel tank as is conventional.

An assembly 5 for indicating the level of fuel in the fuel tank is mounted on the casing 2. The assembly 5 includes a float lever 6 which adjusts the electrical resistance of a potentiometer 7 as a function of the fuel level 8 in the tank. Accordingly, the electrical resistance of the potentiometer corresponds to the specific level of the fuel in the tank which in turn reflects the fuel quantity in the tank.

The assembly 5 is attached to a holder 9 which is slidably supported in a groove 10 formed in the casing 2. A spring contact strip 11 is mounted in the groove 10 and is in electrical contact with potentiometer 7. The casing wall is inclined as shown in FIG. 2 and the position of the holder 9 is secured in the groove 10 by engagement of a pin 13, on a resilient support bracket 12 on holder 9, in a selected one of a series of holes 14 formed in the casing wall within the groove 10. The holder 9 is retained by the casing 2 by a conventional tongue and groove connection 30 at the lateral sides of the holder 9.

The assembly 5 is mounted on the casing wall by engaging the holder 9 in the upper end of groove 10 and sliding the holder 9 downwardly in the groove 10 until the pin 13 resiliently engages in the selected hole 14. Thereupon, the holder 9, and thereby assembly 5, is secured in a determined height position on the casing 2 at which the float lever 6 will have a free range of movement from full to empty state of the fuel in the tank. In all positions of the holder 9 in groove 10, the potentiometer 7 is electrically connected by spring contact strip 11 to outside circuit means (not shown) for indicating the fuel quantity in the tank depending on the position of float lever 6.

Referring to FIG. 2, therein is shown the assembly 5 mounted on the holder 9. The holder 9 is provided with a hole 15 which loosely receives an elbow portion 16 of float lever 6 so that the elbow portion is slidably and rotatably adjustable in the hole. A lever arm 17 is secured to float lever 6 to travel therewith, and for this purpose lever arm 17 has a hole 18 through which elbow portion 16 passes. Lever arm 17 has at its lower edge portion 19 a bent slider which rides on a curved surface of collar 20 of holder 9 as the float lever 6 undergoes pivotal movement due to change in the fuel level in the tank. At its upper edge, the lever arm 17 is formed with an edge portion 21 having a retaining lip 24 which slides on a curved surface of a collar 22 on holder 9. In this way, lever arm 17 is guided axially and radially, relative to holder 9 as float lever 6 undergoes pivotal movement within hole 15. The curved surfaces of the collars 20, 22 are circular and have as their center, a central axis of hole 15.

The float lever 6 is releasably secured to the lever arm 17 to retain elbow portion 16 axially within hole 15 of holder 9 by engagement of bent tabs 23 on lever arm 17 around lever 6.

Precise axial and radial guidance of the float lever 6 and lever arm 17 is obtained by the above construction.

The only securing connection between the float lever 6 and the lever arm 17 is by the bent tabs 23. Complex axial connection means heretofore used in the conventional constructions is eliminated.

In order to separate the float lever 6 from the assembly 5 it is only necessary to extract the float lever from the bent tabs 23. For this purpose, the bent tabs are resilient to snap-engage the float lever 6 when installing same and to resiliently release the float lever when the lever 6 is to be separated.

As long as the edge portion 21 of lever arm 17 grasps collar 22 and the edge portion 19 engages collar 20, the lever arm 17 is held captive in holder 9 when the float lever 6 is engaged and disengaged from the lever arm 17.

The lever assembly 5 carries feelers 25 which contact the potentiometer 7 and vary the electrical resistance thereof as the float lever 6 changes position as the fuel level changes in the fuel tank.

Although the invention has been described with reference to mounting assembly 5 and holder 9 on the casing 2 of the fuel pump, this is merely by way of example and convenience, and alternatively, these can be mounted on an independent separate, support member provided in the fuel tank.

It will become apparent to those skilled in the art that numerous other modifications and variations can be made within the scope and spirit of the invention as defined in the attached claims.

What is claimed is:

1. Apparatus for indicating the fuel level in a fuel tank wherein electrical resistance of a potentiometer is varied as a function of fuel level in the tank, said apparatus comprising:

a potentiometer, a holder for supporting said potentiometer in a fuel tank, and a float lever assembly supported by said holder, said float lever assembly having contacts connected to the potentiometer to vary electrical resistance of the potentiometer as a function of fuel level in the fuel tank, said float lever assembly comprising a float lever including an elbow portion rotatably supported in a hole provided in said holder, and a lever arm secured to said float lever for travel therewith, said lever arm having a hole through which said elbow portion of the lever passes, said lever arm further having upper and lower edges and including engagement means at said upper and lower edges for engaging said holder to undergo sliding on said holder as said float lever rotates in the hole in said holder, said holder including collars respectively engaged by said engagement means so that the lever arm is retained by the collars and is guided radially and axially as said elbow portion of the float lever rotates in the hole of the holder.

2. Apparatus as claimed in claim 1, comprising clip means releasably connecting said float lever and said lever arm together.

3. Apparatus as claimed in claim 2, wherein said clip means comprises resilient clips on said lever arm releasably securing said float lever to said lever arm.

4. Apparatus as claimed in claim 1, wherein said engagement means at the upper and lower edges of said lever arm slidably ride on said collars.

5. Apparatus as claimed in claim 4, wherein the engagement means at said upper edge of the lever arm includes a retaining lip slidably engaging the collar at an upper edge of the holder.

6. Apparatus as claimed in claim 1, wherein said collars have curved surfaces guidably engaging said engagement means at the upper and lower edges of the lever arm respectively.

7. Apparatus as claimed in claim 6, wherein said curved surfaces of said collars have centers which are coincident with a center axis of said hole.

* * * * *